UNITED STATES PATENT OFFICE.

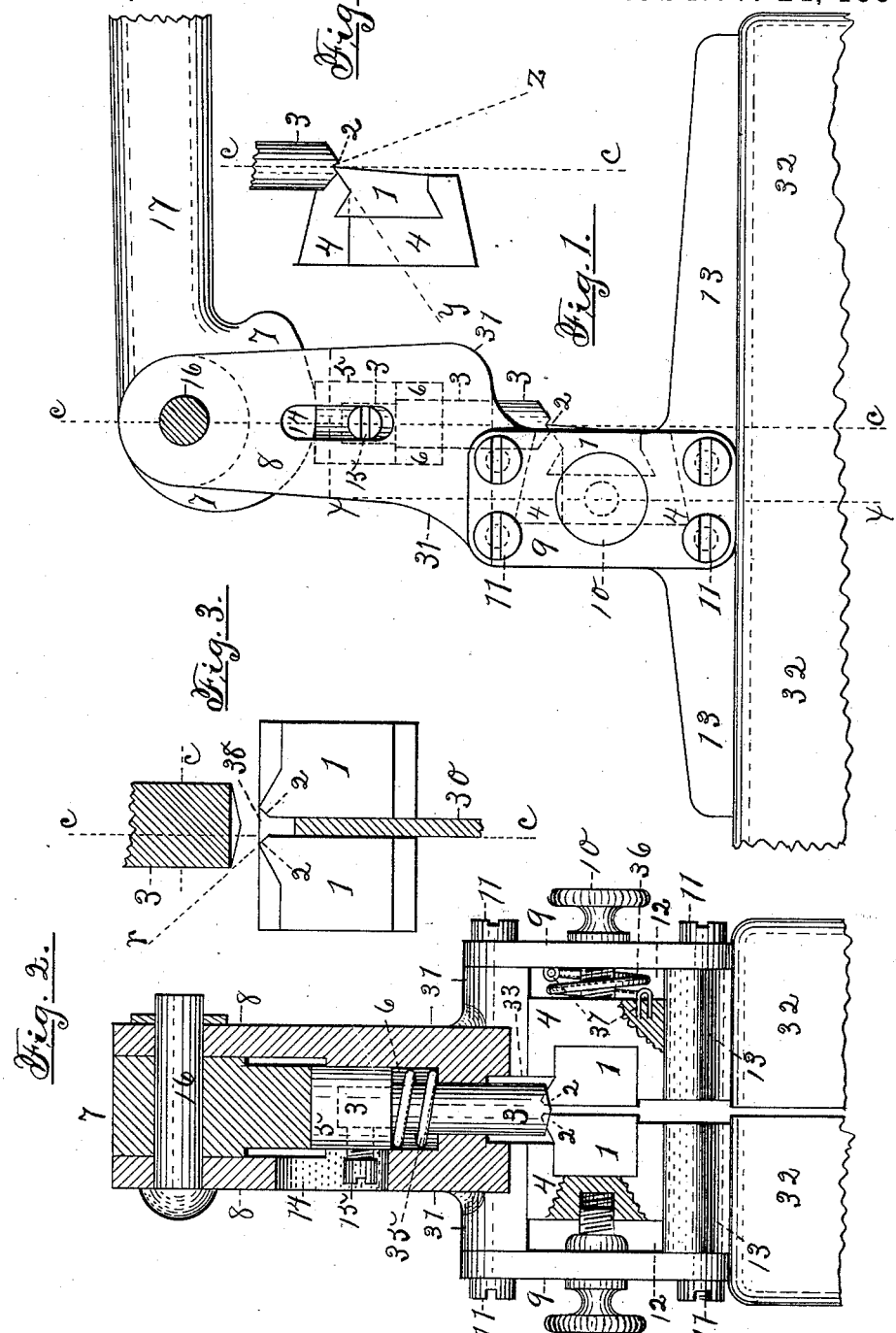

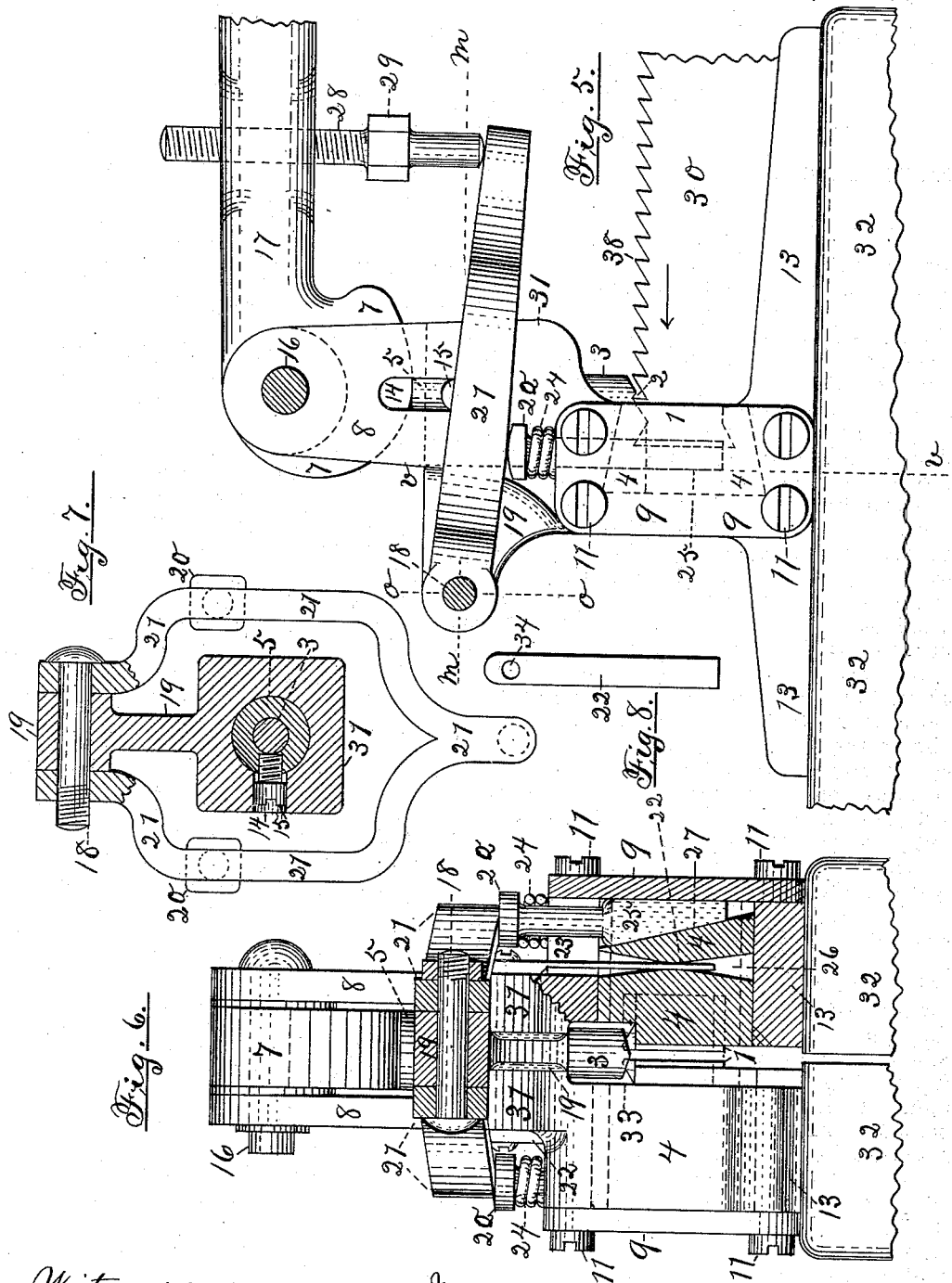

JAMES E. TRAVERSE, OF CINCINNATI, OHIO.

MACHINE FOR SWAGING SAW-TEETH.

SPECIFICATION forming part of Letters Patent No. 331,262, dated November 24, 1885.

Application filed August 15, 1885. Serial No. 174,526. (No model.)

*To all whom it may concern:*

Be it known that I, JAMES E. TRAVERSE, a citizen of the United States, residing at Cincinnati, in the county of Hamilton and State of Ohio, have invented certain new and useful Improvements in Saw-Tooth Upsets, of which the following is a specification, reference being had to the accompanying drawings.

My invention relates to a device for upsetting the teeth of saws, especially band-saws used for sawing lumber.

The object of my invention is to produce a machine-tool for upsetting the saw-teeth, which will operate rapidly and more regularly than the work can be done by hand-hammering.

The machine consists, essentially, of a frame, a vertical reciprocating shaft, on the lower end of which the upset is formed, and clamping-dies held within the frame and adapted to clamp and hold the saw and support the tooth during the operation of the upset-tool. The clamping-dies may be adjusted by hand, so as to clamp the saw and support the tooth each time a tooth is operated upon, or the clamping-dies may be operated by means of the automatic attachment set forth, so as to automatically clamp the jaws each time the upset operates. The power required is given the upset by means of an eccentric cam at the end of a lever.

Figure 1 is a view of the left side of the machine, having clamping-dies adjustable by hand. Fig. 2 is a view of the front end of the same, the sections being along the lines $c\,c$ and $x\,x$ of Fig. 1. Fig. 3 is an enlarged view of the clamping-dies and a sectional view of the upset, and also of a saw clamped between the dies, the sections being along the line $c\,c$ of Fig. 1. Fig. 4 is a side view of the inner side of one of the clamping-dies—the right-hand die—and of the die-block or die-holder. The lower end of the upset is also shown. Fig. 5 is a view of the left side of the machine, having the attachment for automatically operating the clamping-dies. In this figure, a portion of a saw, 30, is shown in adjustment. Fig. 6 is a view of the back end of the machine shown in Fig. 5, and partly in section along the lines $v\,v$ and $o\,o$ of Fig. 5. Fig. 7 is a top view of the forked lever 21 of the automatic attachment and of the cross-section on the line $m\,m$ of Fig. 5, showing how the forked lever is attached to the frame of the machine. Fig. 8 is a side view of a flat spring, 22.

The same numbers indicate the same parts in all of the figures.

The machine is designed so that the cutting-edge of the tooth to be operated upon is brought into the vertical center line, $c\,c$, of the machine, as shown in Fig. 5.

By reference to Figs. 1, 2, 3, 4, and 5 the action of the upset and of the clamping-dies in upsetting a saw-tooth may be easily understood. The clamping-dies 1 have their opposing sides parallel and adapted to clamp and hold securely the saw-blade. They have projections 2, shaped as shown in Figs. 3, 4, and 5, to support the saw-tooth and to assist the upset in forming the cutting-edge of the tooth. The front surface of the dies 1 and their projections 2 is inclined forward at an inclination corresponding to the front edge of the saw-tooth, as shown in Fig. 4. The back surface of the die projections 2 is inclined to correspond with the back of the saw-tooth, and as indicated by the acute angle between the lines $c$ and $y$. The lower end of the upset 3 has a notch cut across it, and the rear surface of this notch has the same inclination as the back surface of the saw-tooth, as seen in Fig. 4, while the front surface is but slightly inclined to the vertical $c\,c$, as shown by the inclined line $z$.

Referring to Fig. 3, it is seen that the apexes of the pyramidal projections 2 are cut away at an acute angle to the vertical, as indicated by the angle between the lines $c$ and $r$. It is also seen in Fig. 3 that the bottom edge of the notch in the upset 3 is parallel to the cutting-edge of the saw-tooth 38.

In consequence of the above construction of the clamping dies and of the end of the upset it is plain that if a saw-tooth be clamped between the dies and in the adjustment indicated in the figures when the upset is driven down upon the edge of the tooth it will swage the material of the tooth into the space between the end of the upset and the operating-surfaces of the projections 2 of the clamping-dies, and will consequently widen the cutting-edge of the tooth, as shown at 38 in Fig. 3.

The machine is also designed so as to rest upon and be guided by the long wooden clamps 32, between which the saw is permanently clamped during the upsetting process. The clamps 32 are such as are used for holding saws while sharpening them, and are attached to a table.

The main frame of the machine consists of an integral casting, 13 31 8. The parallel horizontally-projecting bases 13 are adapted to slide upon the wooden clamps 32, and as the saw projects up into the slot 33 between them they are guided by the saw-blade also, and thus the machine is prevented from falling off of the wooden clamps 32, and is maintained in position for repeated and rapid adjustment.

Figs. 1, 2, 3, and 4 show the essential features of the clamping-dies and how they are operated. The clamping-dies 1 are securely held in die-holders 4 by being dovetailed into the holders, and the latter are dovetailed into the main frame 13 31 8, but are free to slide in their bearings at right angles to the saw-blade. The dovetailed slot for the die in the die-holder does not extend entirely through the holder, as shown, so that in the operation of clamping the die is held securely at the end against the body of the holder. The side plates, 9, are held in place by screws 11, and may be removed to insert or remove the die-holders. When a saw is to have its teeth swaged, the dies are separated to admit the saw. They must then be made to clamp the saw-blade, and must be adapted to be adjusted so that the dies will come into the position required for swaging, and they must be capable of being easily loosened and tightened, and these operations should be accomplished rapidly and certainly.

I have devised different ways of operating the die-holders in the manner above required. One way is shown in Fig. 2, on the left, where a milled-headed screw, 10, is secured in bearings in the side plate, 9, and where the end of the die-holder 4 is tapped for the screw 10, as shown, where the end of the die-holder 4 is broken away. By turning the screw 10 with the hand the die-holder is caused to approa or recede from the saw-blade. When the die-holders are operated in this manner, the one on the right may be adjusted to the saw to be operated upon, and then not disturbed, while the one on the left may be loosened and tightened each time the machine is to be adjusted to a saw-tooth. Another way of operating the die-holders, which differs but slightly from that just set forth, is shown on the right in Fig. 2. There the side plate, 9, is tapped and the screw 10 works in the side plate as a nut and advances to and fro as it is turned one way and the other. The end of the screw abuts against the end of the die-holder, and when the screw is advanced it pushes the die-holder ahead. A coil-spring, 36, is fastened to the outer end of the die-holder 4, and to the inner side of the side plate, 9, and is extended when the screw 10 is advanced. When the screw recedes, the spring 36 draws the die-holder back toward the side plate. The spring 36 is shown secured by means of small wire staples 37. The staples may be secured by means of lead.

Another way of operating the die-holders will be set forth in the modification of the machine shown in Figs. 5 to 8. The description of the modification under consideration, however, will first be continued.

In Figs. 1 and 2 the main frame 13 31 8 is bored out centrally, as shown at 6, and a cylindrical sliding block, 5, is fitted to slide in this hole. This sliding block has a central socket-hole in the under side for a spindle, which is formed at the upper end of the upset-shaft 3, and a set-screw, 15, secures the said spindle in the sliding block. A slot, 14, in the side 8 of the main frame enables the set-screw to be introduced and removed, and the head of the set-screw having a diameter equal to the width of the slot, the set-screw serves also to guide the sliding block, and consequently the upset, always in the correct position. The top of the main frame above the sliding block 5 is slotted, and the remaining sides 8 support a fulcrum pin or bolt, 16, and the latter carries an eccentric, 7, having a hand-lever, 17. A coil-spring, 35, placed beneath the sliding block 5 in the hole 6, supports the sliding block and the upset, and presses the former against the eccentric, so that when the handle 17 is lifted the upset is maintained elevated and out of the way. When the dies are adjusted to a saw-tooth and made to clamp the saw-blade, and the handle 17 is pressed down, the notched upset 3 is forced down by the eccentric 7 upon and against the end of the tooth and swages it into the desired shape.

The modification shown in Figs. 5 to 8 will now be described, and also the other way of operating the dies previously alluded to. In this modification the essential features are the same as set forth in the first modification. The modification pertains to means for automatically operating the dies from and coincident with the action of the eccentric 7 and handle 17. Here the main frame 13 31 8 is modified slightly to accommodate the changes in the operating parts, as will be seen by an inspection of the several figures. The dies are the same as previously described, but the die-holders 4 are modified. The section of the die-holder 4 is along the plane $v\,v$ of Fig. 5 and coincident with the back side of the wedge-piece 25. The die-holder here is extended and has a vertical tapering hole, 26, through it. The hole is tapered one way only, and has a uniform width, which corresponds to that of the flat spring 22 that extends down into this hole. The width of the spring 22 is shown in the view of Fig. 8. The spring 22 has a small screw-hole, 34, in its upper end, and its upper end is secured to the side of the main frame by a small screw passed through this hole 34, as shown in Fig. 6. A slot, 23, in the main frame, directly over the hole 26, permits the passage of the spring. The hole 26 tapers to the middle, where the spring 22 bears against the die-holder, and in operating forces the latter outward and away from the saw-blade. Beyond the hole 26 the die-holder end is beveled off, as shown at 27, and a wedge-shaped piece, 25, having one side beveled to slide upon the beveled end of the die-holder, and the other side parallel with the face of the side plate, 9, so as to slide against that plate is placed between the die-holder and the side plate, as shown in Fig. 6, and is adapted to be moved vertically. The width of the wedge 25 is the same as that of the spring 22, is uniform, and is shown in Fig. 5. When the wedge 25 is moved downward, it forces the die-holder 4 and the free end of the spring 22 toward the saw. The wedge 25 has a vertical stem at its upper end, which terminates in a head, 20. Between the head 20 and the top of the horizontally-projecting part of the main frame is interposed a coil-spring, 24. This spring serves to force the wedge 25 upward. The side plate, 9, being secured by the screws 11, is removable, and can be removed to insert the die-holder 4. The spring 22 and the wedge 25 can be placed or replaced through the slot 23 in the main frame.

On the back part of the main frame, and in common therewith, is cast a projection, 19, which has a boss at its extremity, and this boss carries a pin or bolt, 18, which serves as a fulcrum for a forked lever, 21, whose branches pass around the frame, as clearly seen in Fig. 7, and unite in front, and rest upon the heads 20 of the wedges 25, as seen in Figs. 5 and 6. A hole is made and tapped through the handle 17 for a screw, 28, which has a hexagonal center, 29, for a wrench. The end of this screw is designed to press down the free end of the forked lever 21 whenever the handle 17 is lowered.

The construction of the automatic device for operating the dies or die-holders being explained, the operation of the device can easily be comprehended. When the handle 17 is raised, the springs 24 force the wedges 25 20 up, and they in turn elevate the forked lever 21. The wedges 25 now being moved out of the way, the springs 22 are free to act, and in so doing they force the die-holders 4 outward and away from the saw-blade.

With any of the means set forth for operating the die-holders the parts must be so adjusted that the clamping-dies 1 will clamp securely the saw-blade before the instant that the upset 3 touches the end of the tooth. With the automatic device just described this adjustment is easily and quickly made by turning the screw 28. This automatic device must be adjusted by means of the screw 28 each time a saw of a different thickness is to be upset. The proper way to make this adjustment is to place the saw in the clamps 32, the machine upon the clamps, and move it along until the dies are in adjustment with one of the teeth. Then the handle 17 should be lowered until the upset 3 rests upon the end of the tooth. The screw 28 is then turned until the dies clamp the saw-blade by the force due to the weight of the handle 17, and until the upset is just raised off of the saw-tooth. This brings the parts into approximate adjustment. Correct adjustment must be attained afterward by trial.

Extra dies and upset-tools, shaped to correspond to the teeth of saws having different-shaped teeth, may be furnished with the machine and substituted for each other.

I claim—

1. In a saw-tooth-upsetting machine, the combination of a saw-tooth upset having the operating-surfaces inclined to correspond with the front and back surfaces of the saw-tooth, an extension or holder sliding in guide-bearings in the frame and guided in a right line therein reciprocally toward the cutting-edge of the saw-tooth, the said guide-bearings, the said frame, and saw-tooth dies having parallel and smooth or rough blade-clamping surfaces and inclined diverging surfaces adjacent the sides of the tooth-point, the said frame serving to support or hold all of the parts of the device, substantially as and for the purposes set forth.

2. In a saw-tooth-upsetting machine, the combination of die-holders for the saw-tooth, clamping-dies having bearing-surfaces fitted to corresponding recessed bearing-surfaces of the supporting-frame, and affording means for guiding the holders and dies perpendicularly toward and from the saw-blade, the said clamping-dies, and the said frame, the said frame serving to support or hold all of the parts of the device, and having guiding-surfaces adapted to slide upon and be guided by a suitable but independent saw-support, substantially as and for the purposes set forth.

3. In a saw-tooth-upsetting machine, the combination of saw-tooth-clamping die-holders, the said clamping-dies, and a supporting-frame, the said die-holder having a recess adapted to receive and secure a corresponding portion of the said die, and having sliding bearing-surfaces fitted to corresponding recessed bearing-surfaces in the said frame, and the latter having a central opening for introducing the saw-blade, and having guiding-surfaces adapted to slide upon and be guided by a suitable but independent saw-support, substantially as and for the purposes set forth.

4. In a saw-tooth-upsetting machine, the combination of saw-tooth-clamping die-holders having bearing-surfaces fitted to corresponding bearing-surfaces of the frame of the machine, whereby the holders are guided toward and from the saw-blade, the said frame, and wedges, the said die-holders having beveled surfaces, against which the said wedges act to force the holders against the saw-blade, and the said frame having guiding-surfaces adapted to slide upon and be guided by a suitable but independent saw-support, substantially as and for the purposes set forth.

5. In a saw-tooth-upsetting machine, the combination of a saw-tooth upset having the operating-surfaces inclined to correspond with the front and back surfaces of a saw-tooth, a reciprocating sliding extension or part guided in the machine-frame, a spring acting between the frame and the said part guiding the upset, an eccentric cam turning about a fulcrum supported by the said frame, the fulcrum, and the said frame, the said spring serving to elevate the upset and the cam to depress it, substantially as and for the purposes set forth.

6. In a saw-tooth-upsetting machine, the main frame 13 31 8, having a base provided with one or more guiding-extensions parallel with the saw-blade, an opening adjacent the said extension and in the plane of the upset and the saw-blade when in place, and adapted for introducing the saw-blade, lateral recesses and bearing-surfaces adapted to receive the dies and die-holders, openings and bearing-surfaces corresponding to the upset and the parts co-operating directly therewith, the said guiding extension or extensions being adapted to slide upon a suitable but independent saw-support, substantially as and for the purposes set forth.

7. In a saw-tooth-upsetting machine, the combination of the main frame 13 31 8, the clamping-dies 1, the die-holders 4, having provision, as set forth, for securing the dies, and having the dovetailed shape and bearing-surfaces set forth, by which they are guided in the framing, the upset-tool 3, sliding block 5, spring 35, eccentric cam 7, and cam-fulcrum 16, suitable means being provided for moving the die-holders toward or from the saw-blade.

8. In a saw-tooth-upsetting machine, the combination of the main frame 13 31 8, the die-holders 4, having the dovetailed shape and bearing-surfaces set forth, by which they are guided in the framing, and the removable side plates, 9.

9. In a saw-tooth-upsetting machine, the combination of the main frame 13 31 8, having openings and bearing-surfaces for the die-holders, slots 23 and a projection, and fulcrum-boss 19, the side plates, 9, the die-holders shaped and adapted to slide within the corresponding frame-bearings and having beveled bearing ends 27, springs for forcing the die-holders apart, wedges 25 20, wedge-springs 24, the fulcrum-pin 18, the forked lever 21, the adjusting-screws 28, and the cam-lever 17, having a tapped hole for the screw 28.

In testimony whereof I now affix my signature in presence of two witnesses.

JAMES E. TRAVERSE.

Witnesses:
 THOMAS R. FLOWER,
 E. P. ROBBINS.